(12) United States Patent
Miyamura et al.

(10) Patent No.: US 7,312,999 B1
(45) Date of Patent: Dec. 25, 2007

(54) HIGH DENSITY DRIVE CHASSIS ASSEMBLY

(75) Inventors: Harold Miyamura, San Jose, CA (US); Marc Moisson, Los Altos, CA (US); Salvatore Bondi, San Francisco, CA (US); David J. Baik, San Jose, CA (US); David Willheim, Los Gatos, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 378 days.

(21) Appl. No.: 11/118,935

(22) Filed: Apr. 29, 2005

(51) Int. Cl.
*H05K 1/00* (2006.01)
*G06F 1/16* (2006.01)

(52) U.S. Cl. ........................ 361/724; 361/685
(58) Field of Classification Search ................ 361/724
See application file for complete search history.

(56) References Cited

U.S. PATENT DOCUMENTS

| | | | |
|---|---|---|---|
| 5,506,750 A * | 4/1996 | Carteau et al. ............. | 361/685 |
| 6,411,506 B1 * | 6/2002 | Hipp et al. ................. | 361/686 |
| 6,459,571 B1 * | 10/2002 | Carteau ...................... | 361/684 |
| 6,510,050 B1 * | 1/2003 | Lee et al. ................... | 361/685 |
| 6,819,560 B2 * | 11/2004 | Konshak et al. ............ | 361/687 |
| 6,862,173 B1 * | 3/2005 | Konshak et al. ............ | 361/685 |
| 6,957,291 B2 * | 10/2005 | Moon et al. ................ | 361/685 |
| 7,042,720 B1 * | 5/2006 | Konshak et al. ............ | 361/687 |
| 7,200,008 B1 * | 4/2007 | Bhugra ....................... | 361/724 |
| 2003/0147211 A1 * | 8/2003 | Fairchild .................... | 361/687 |
| 2005/0257232 A1 * | 11/2005 | Hidaka ....................... | 720/654 |
| 2006/0061955 A1 * | 3/2006 | Imblum ...................... | 361/685 |

* cited by examiner

*Primary Examiner*—Lisa Lea-Edmonds
(74) *Attorney, Agent, or Firm*—Suiter Swantz pc llo

(57) ABSTRACT

The present invention is an apparatus for supporting the dense integration of a plurality of multi-drive modules. A chassis assembly of the present invention may house a plurality of multi-drive modules whereby each multi-drive module may house multiple drives. Each multi-drive module may be easily removed from the chassis for reduced serviceability time. Each drive may be housed within a carrier assembly, the carrier assembly being easily removed from the multi-drive module of the present invention. Advantageously, a dense integration of drives may be achieved while providing proper ventilation and vibration dampening.

40 Claims, 9 Drawing Sheets

HIGH DENSITY DRIVE CHASSIS ASSEMBLY

FIELD OF THE INVENTION

The present invention generally relates to the field of storage systems, and more specifically to a chassis for housing modules containing multiple drives.

BACKGROUND OF THE INVENTION

The efficient and precise storage of electronic data is one of the most important considerations of modern life. Businesses, schools and governments rely upon mass storage in daily operations. Consequently, mass storage systems have been developed to provide persistent and reliable data storage.

A typical storage system may include a computing appliance operatively coupled to mass storage devices connected according to various communication protocols. A computing appliance may refer to a programmable machine capable of executing a list of instructions. A computing appliance may include a processing unit which executes instructions and memory for storage of data and execution instructions. A mass storage device may refer to devices for retention of data, including floppy disks, hard disks, optical disks, tapes and the like. In conventional storage systems, each mass storage device is housed in an individual receptacle. In order to provide a substantial amount of storage, individual receptacles housing single drives may be placed in a side by side configuration. This significantly increases the overall form factor of the chassis for housing the drives. Efforts to increase the packing density of hard disk drives, thus reducing the overall form factor of a chassis, have been thwarted by current technology limitations, such as lack of sufficient cooling of the drives, vibration issues and rotational vibration transmissibility. Consequently, an improved chassis for housing of multiple drives is necessary.

SUMMARY OF THE INVENTION

Accordingly, the present invention is directed to an apparatus for supporting the dense integration of a plurality of multi-drive modules. In an embodiment of the invention, a chassis assembly of the present invention may house a plurality of multi-drive modules whereby each multi-drive module may house multiple drives. Each multi-drive module may be easily removed from the chassis assembly for reduced serviceability time. Each drive may be housed within a carrier assembly, the carrier assembly being easily removed from the multi-drive module of the present invention. Advantageously, a dense integration of drives may be achieved while providing proper ventilation and vibration dampening.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
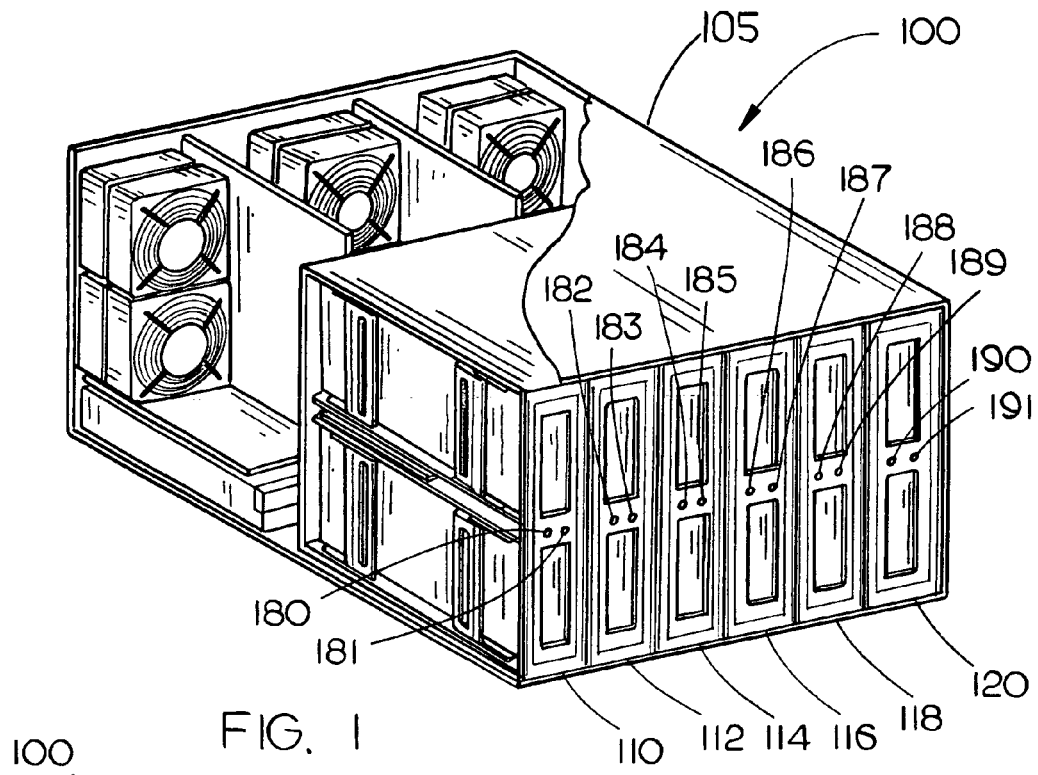
FIG. 1 depicts a frontal view of a chassis assembly in accordance with an embodiment of the invention.
Figure 2:
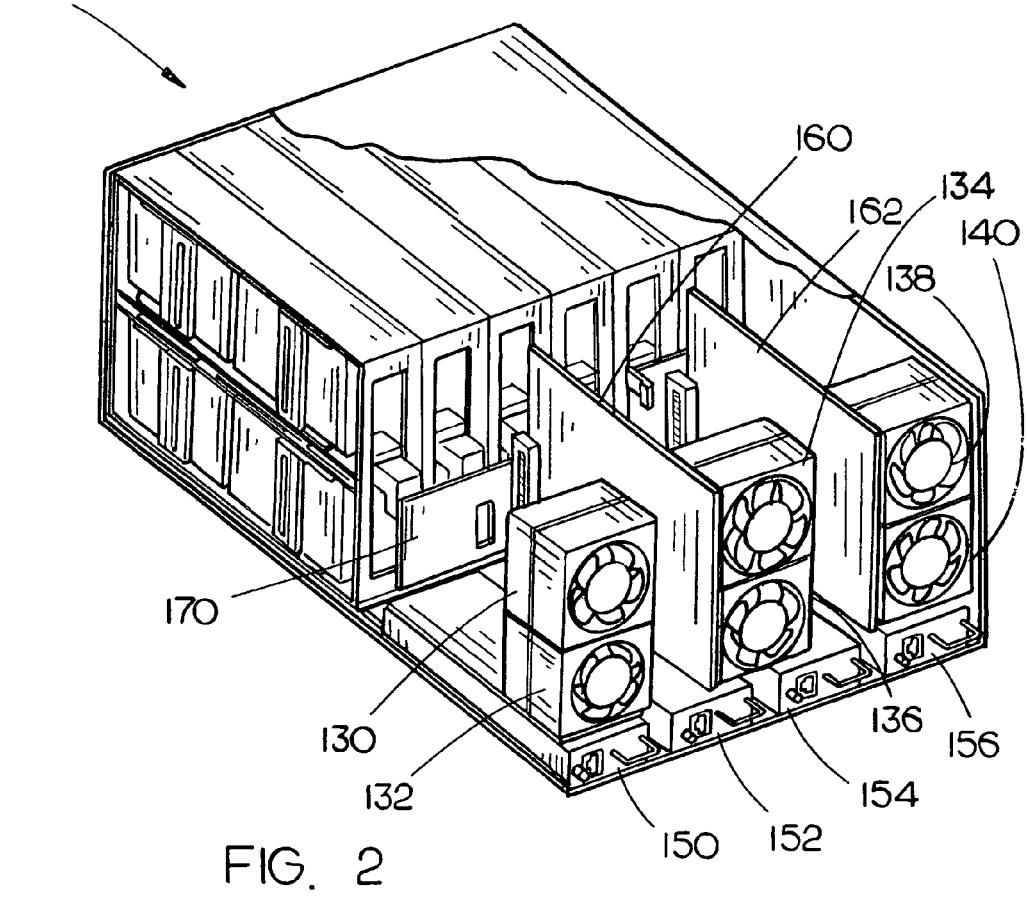
FIG. 2 depicts a rear view of a chassis assembly in accordance with an embodiment of the invention.

Referring to FIG. 1, a frontal view of a chassis assembly 100 in accordance with an embodiment of the invention is shown. FIG. 2 depicts a rear view of chassis assembly 100 in accordance with the present invention. Chassis assembly 100 may include a chassis 105 and may house a plurality of multi-drive modules 110-120 whereby each multi-drive module 110-120 may house a plurality of drives. Chassis 105 may be a frame, constructed of sheet metal, for example, which may enclose and house components of chassis assembly 100. Chassis 105 may be constructed in a variety of configurations including different lengths, widths, heights and the like without departing from the scope and intent of the present invention. In one embodiment of the invention, chassis assembly 100 may house, for example, six multi-drive modules. Multi-drive modules 110-120 may each include one or more visible alerts 180-191. Visible alerts may alert a system administrator of an error, operational defect, required maintenance and the like associated with the chassis assembly 100. For example, visible alert 180 may indicate a failed drive within multi-drive module 110. Visible alert 180-191 may be a light emitting diode according to one embodiment of the invention.

Chassis assembly 100 may also include fans 130-140. Power supplies 150-156 may supply power for the drives and other components of the chassis assembly 100. Controllers 160-162 are also included. Controllers 160-162 may be serial attached small computer system interface (SAS) controllers. Chassis assembly 100 may also include a board 170 for cable-less coupling with the multi-drive modules 110-120 while not restricting air flow within the chassis assembly 100. Board 170 may be a circuit board and may be located in the middle of the chassis assembly 100. It is contemplated that board may refer to any piece of material on which electrical components are mounted and interconnected in the formation of one or more circuits. Cable-less coupling allows easier installation and maintenance of the components within chassis assembly 100. Air flow may be directed by cooling fans 130-140 which allows air movement between each multi-drive module 110-120. Advantageously, each drive of each multi-drive module may not be restricted from air flow.

Arrangement of the multi-drive modules 110-120 may allow for management of shock and vibration issues caused by the drives along with rotational vibration transmissibility issues. Due to the arrangement of the drives, any spinning disk wobble may be effectively canceled by an opposite wobble. For example, any wobble of a drive on one side of the multi-drive module may effectively cancel wobble created by a drive on a second side of a multi-drive module.

Due to the highly dense integration of drives, the overall form factor of the chassis assembly may be suitable for rack and cabinet installation. In one embodiment of the invention, chassis assembly may be approximately 10.5 inches high and may fit within a standard 19 inch rack or cabinet. The unloaded weight of chassis assembly 100 may be approximately 50 lbs. to allow transport of the chassis assembly 100. Additionally, the loaded weight of approximately 150 lbs. may allow installation of the chassis assembly 100 within a rack without any additional support required.

Figure 3:
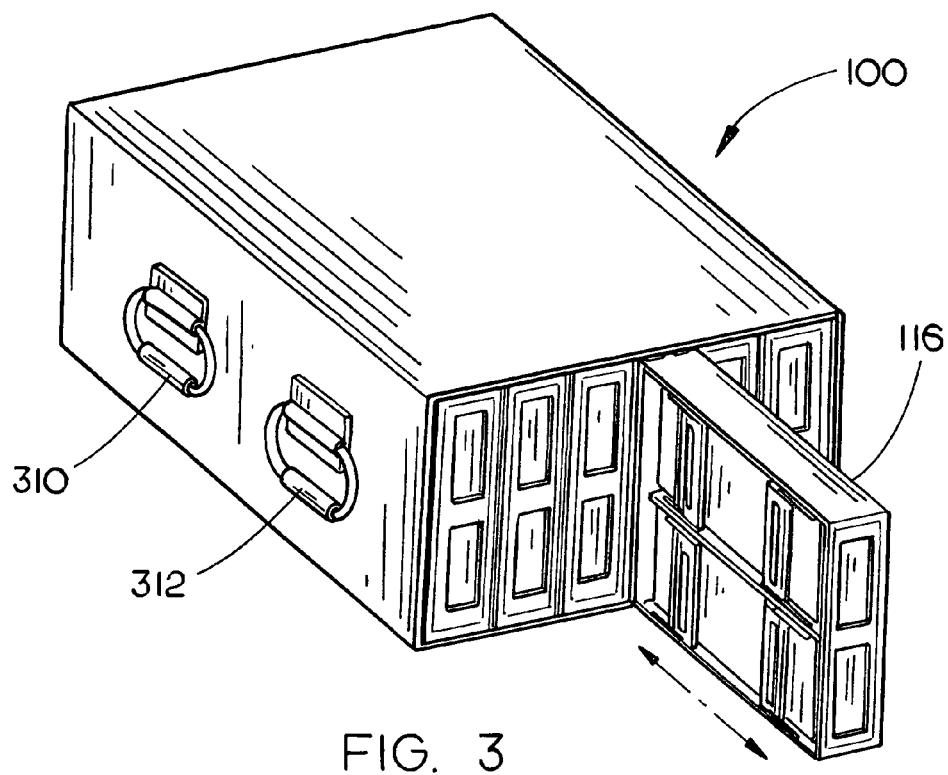
FIG. 3 depicts a chassis assembly including a multi-drive module retention assembly in accordance with an embodiment of the invention.

Referring to FIG. 3, a chassis assembly 100 including a multi-drive module retention assembly in accordance with an embodiment of the invention is shown. Chassis assembly 100 may include handles 310-312 to aid a user in the transport of the chassis assembly 100. A total of four handles, two on each side, may be installed to the chassis assembly 100 according to one embodiment of the invention. The chassis assembly 100 may include a multi-drive retention/extraction mechanism which may secure the multi-drive module in a retained position within the chassis assembly 100 and an extracted position. The multi-drive modules may be secured in a retained position via a spring-loaded latch and the like to allow tool-less installation and removal. In one embodiment of the invention, the multi-drive module may include a cam handle. The cam handle may be a U-shaped piece of metal with a possible plastic-coated gripping surface which may ergonomically install/extract the multi-drive module from the chassis assembly 100. A spring-loaded lock mechanism on the multi-drive module with respective tabs on the chassis assembly 100 may lock a cam handle closed to aid in the prevention of shock and vibration. In an alternative embodiment, a fastener, such as a thumbscrew, may secure a cam handle closed.

Figure 4:
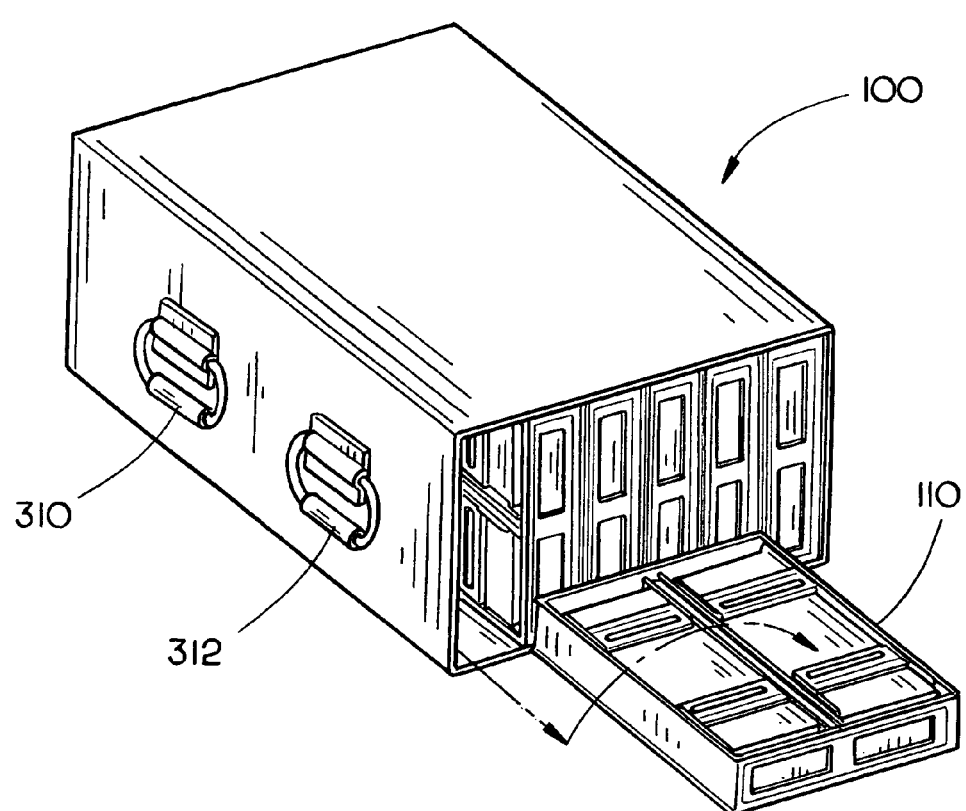
FIG. 4 depicts a chassis assembly including a multi-drive module retention assembly in accordance with an alternative embodiment of the invention.

When the multi-drive module 116 is located in an extracted position, a system administrator (a person) may gain access to the multi-drive module 116 and the drives. This may allow easier maintenance and serviceability. For example, a failed disk drive may be replaced by extracting the corresponding multi-drive module 116, removing the carrier assembly of the failed disk drive and re-installing a carrier assembly with an operational disk drive. This may be accomplished in a tool-less fashion. FIG. 4 depicts a chassis assembly 100 including a multi-drive module retention assembly in accordance with an alternative embodiment of the invention. In the embodiment of FIG. 4, the multi-drive module 110 may include a hangar that may hook onto the chassis assembly 100 in a horizontal position. It is contemplated that either side of the multi-drive module may face the top of the chassis assembly to allow quick access to each of the disk drives. Advantageously, the multi-drive retention/extraction mechanism of FIGS. 3 and 4 may allow tool-less operation.

Figure 5:
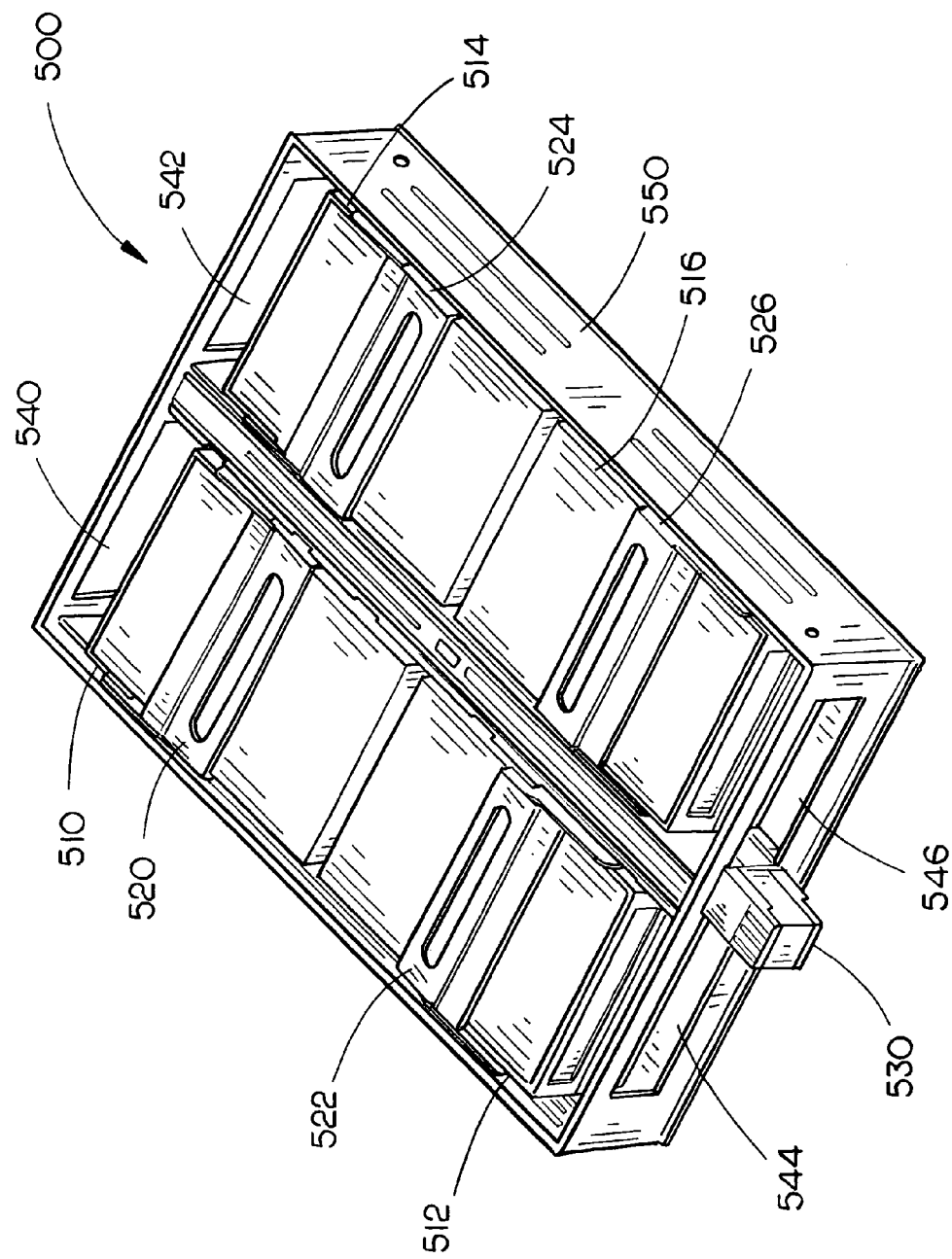
FIG. 5 depicts a multi-drive module with installed carriers in accordance with an embodiment of the present invention.

Referring to FIG. 5, a multi-drive module 500 with installed carriers 510-516 in accordance with an embodiment of the present invention is shown. Multi-drive module 500 may be representative of multi-drive modules 110-120 of FIGS. 1-4. Multi-drive module 500 may be implemented as a frame, constructed of sheet metal and the like, for enhanced rigidity to prevent shock and vibration. Multi-drive module 500 may house, for example, eight carrier assemblies whereby each carrier assembly includes a drive in accordance with one embodiment of the invention. For example, a layer of four carrier assemblies housing four drives may be below carrier assemblies 510-516 to allow storage of eight drives. Multi-drive module 500 may include an internal board, such as a mid-plane board, whereby each of carrier assemblies housing drives may be coupled. This prevents exposure of drive electronics when installed within the multi-drive module 500. Preventing exposure of drive electronics prevents damage to the drives and electrostatic discharge issues. While multi-drive module 500 may store multiple drives, any single drive may be removed without disruption of the other drives. This reduces service time required to repair or replace a failed drive.

Carrier assemblies 510-516 may include handles 520-526 which may allow quick release of the carrier assemblies 510-516 from the multi-drive module 500. A high speed backplane interconnection 530 may be included to allow cable-less coupling to the board 170 of the chassis assembly 100 of FIG. 1. Openings 540-546 allow air flow to pass through the multi-drive module 500 and across the drives. Removable handles (not shown) may couple to a side panel 550 of the multi-drive module 500 to aid in the transportation of a multi-drive module 500.

Figure 6:
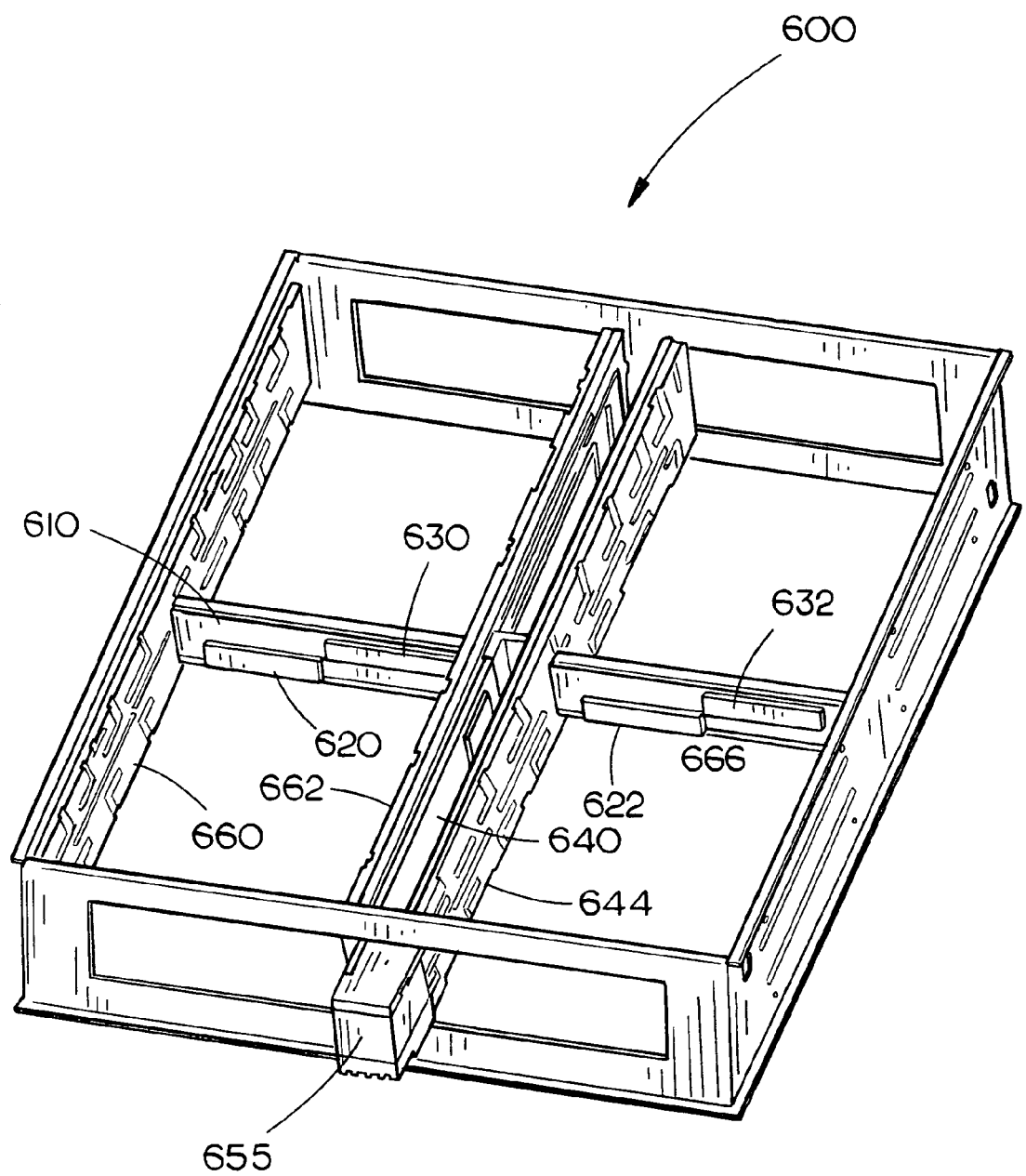
FIG. 6 depicts a multi-drive module without carriers in accordance with an embodiment of the present invention.

Referring to FIG. 6, a multi-drive module 600 without carriers in accordance with an embodiment of the present invention is shown. Multi-drive module 600 may include a board 610. Board 610 may be a circuit board and may refer to any piece of material on which electrical components are mounted and interconnected in the formation of one or more circuits. Board 610 may include connectors 620-622 and 630-632 or either serial advanced technology attachment (SATA) or serial attached small computer system interface (SAS). Connectors may be placed on the opposite side of board 610 for coupling with drives on the opposite side. As shown, board 610 may be placed mid-plane. This may allow cable-less coupling to each drive. A second board 640 may be coupled to board 610 via a connector, such as a PCI Express X8 connector. Second board 640 may be coupled with a backplane interconnection 655 for coupling with the board 170 of the chassis assembly 100. Additionally, board 640 may transfer power from the board 170 of the chassis assembly 100 to the board 610.

Multi-drive module 600 may also include drive guides 660-666. Drive guides 660-666 may be composed of plastic. Drive guides 660-666 may include grooves for receiving drive rollers of drives. Carrier assemblies may include drive rollers which may engage the grooves of the drive guides 660-666 of the multi-drive module 600. Drive guides 660-666 may guide the carrier assemblies and assist alignment of the SATA or SAS connectors. Additionally, drive guides 660-666 may be keyed to prevent an incorrect installation of the carrier assemblies.

Figure 7:
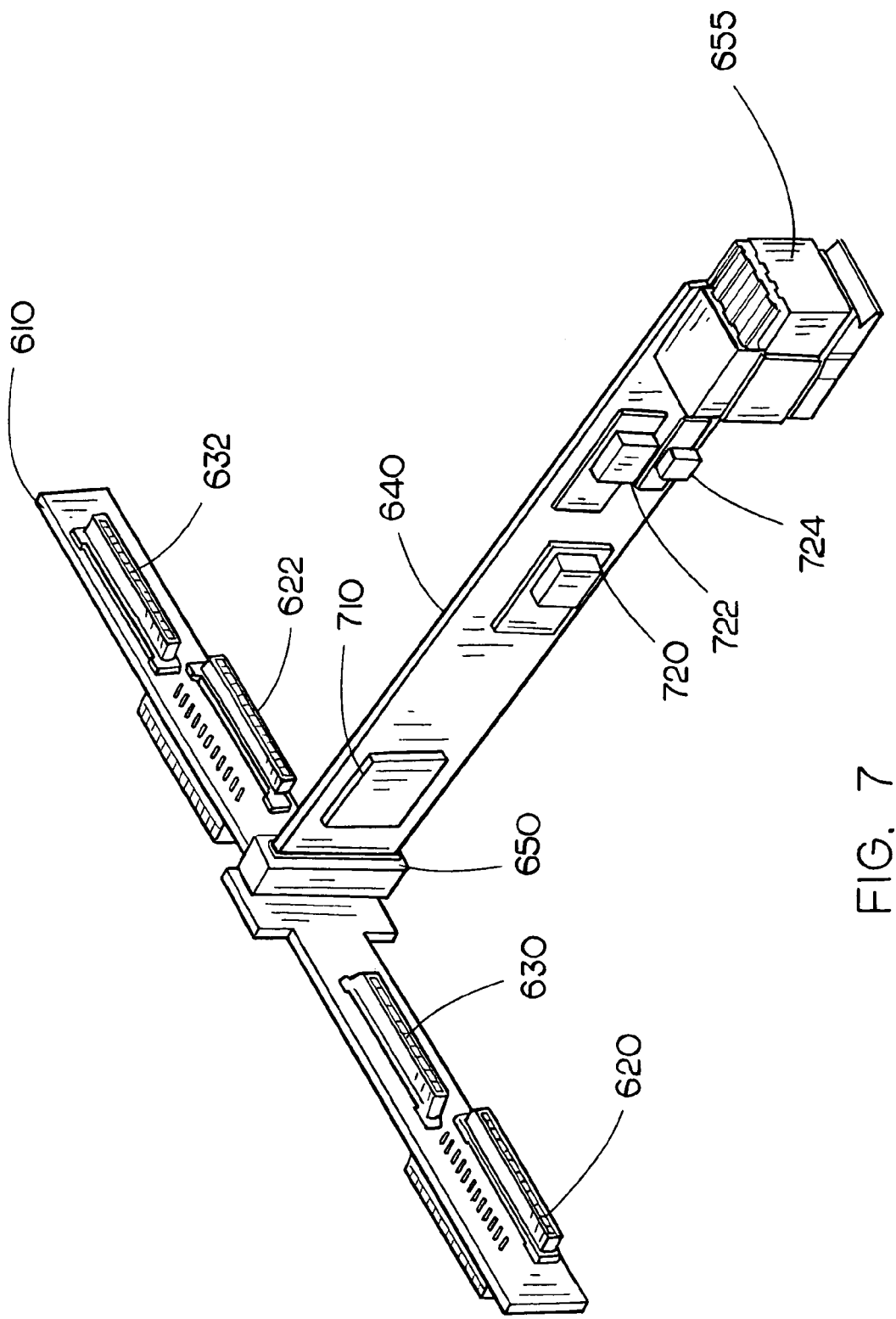
FIG. 7 depicts integrated connectors of a multi-drive module without carriers in accordance with an embodiment of the present invention.

Referring to FIG. 7, an exploded view of the board 610 and second board 640 is shown. Board 610 may include SATA or SAS connectors 620-622 and 630-632. Connectors may be placed on the opposite side of board 610 for coupling with drives on the opposite side. A second board 640 may be coupled to board 610 via a connector 650, such as a PCI Express X8 connector. Second board 640 may include a SAS port expander chip and surface mount voltage regulator modules. In an embodiment of the invention, voltage regulator modules may include a 12 volt voltage regulator module, a 5 volt voltage regulator module and a 3.3 volt voltage regulator module.

Figure 8:
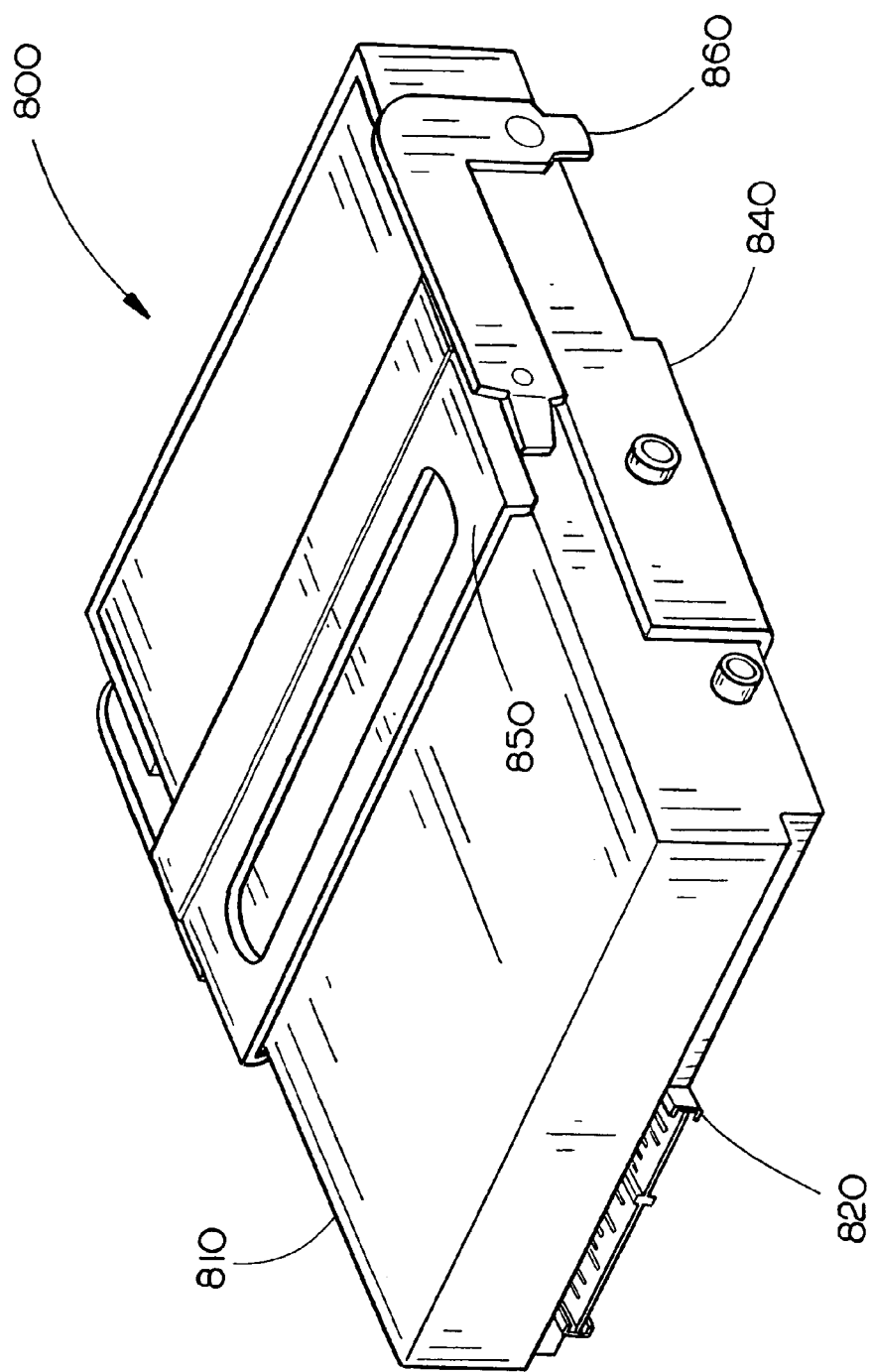
FIG. 8 depicts a carrier assembly in accordance with an embodiment of the present invention.

Referring now to FIG. 8, a carrier assembly 800 in accordance with an embodiment of the present invention is shown. Carrier assembly 800 may be suitable for mounting a disk drive, such as a hard disk drive 810. Hard disk drive 810 may be a SATA or SAS hard disk drive including a SATA or SAS connector 820. A drive holder 840 of the carrier assembly 800 may be comprised of aluminum cast, sheet metal and the like. Carrier assembly 800 may include a carrier handle 850. Carrier handle 850 may allow easier transport of a carrier assembly 800. Carrier handle 850, in combination with an insertion/ejection cam 860, may also allow insertion/extraction of the carrier assembly to and from the multi-drive module. Insertion/ejection cam may retain carrier assembly 800 horizontally within a multi-drive module.

Advantageously, carrier assembly 800 may include drive holder 840 which may protect a disk drive from damage by insulating disk drive electronics from a customer while handling the carrier assembly 800. The drive holder 840 may also dampen rotational vibration transmissibility, shock and vibration pulses created by an operating drive.

Figure 9:
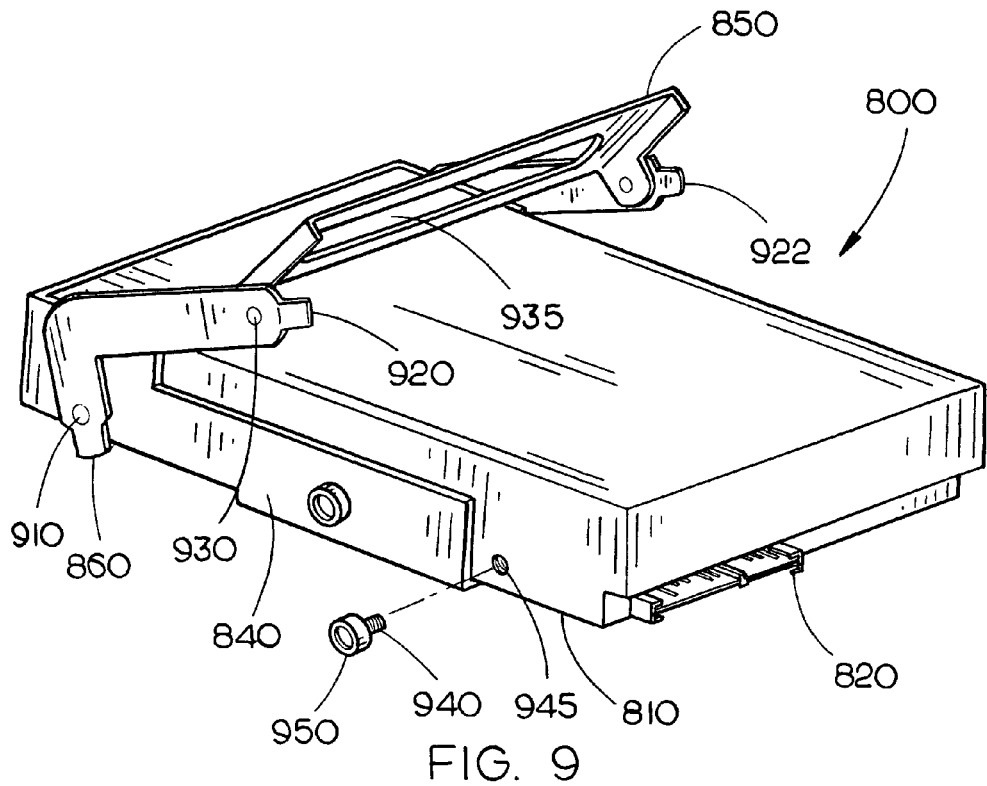
FIG. 9 depicts a carrier assembly including drive rollers in accordance with an embodiment of the present invention.

FIG. 9 depicts a carrier assembly 800 with the carrier handle 850 extended. A pivot 910 may be mounted on the drive holder 840 and the ejector arms 920-922. A pivot 930 may be mounted on the ejector arms 920-922 and the carrier handle 850. Carrier handle 850 may include a slot 935 for finger access to the carrier handle 850. In an embodiment of the invention, the carrier handle 850 may be pressed toward the drive to lock the carrier assembly 800 in to the multi-drive module 500 of FIG. 5.

A drive roller 940 may be coupled to a first and second side of drive 810. Drive roller 940 may engage a groove within drive guides 660-666 of a multi-drive module 600 of FIG. 6. Drive roller 940 may include a threaded shaft to allow finger tightening to an existing threaded slot 945 of the drive 810. Threaded slot 945 is conventionally included in drives according to existing standards. Drive roller 940 may also include a vibration dampener 950. Vibration dampener 950 may be composed of plastic, poron, ISODAMP material and the like for dampening shock and vibration transmitted from the hard disk drive to the multi-drive module and the chassis assembly. Vibration dampener 950 may be pressed or threaded onto the threaded shaft.

Figure 10:
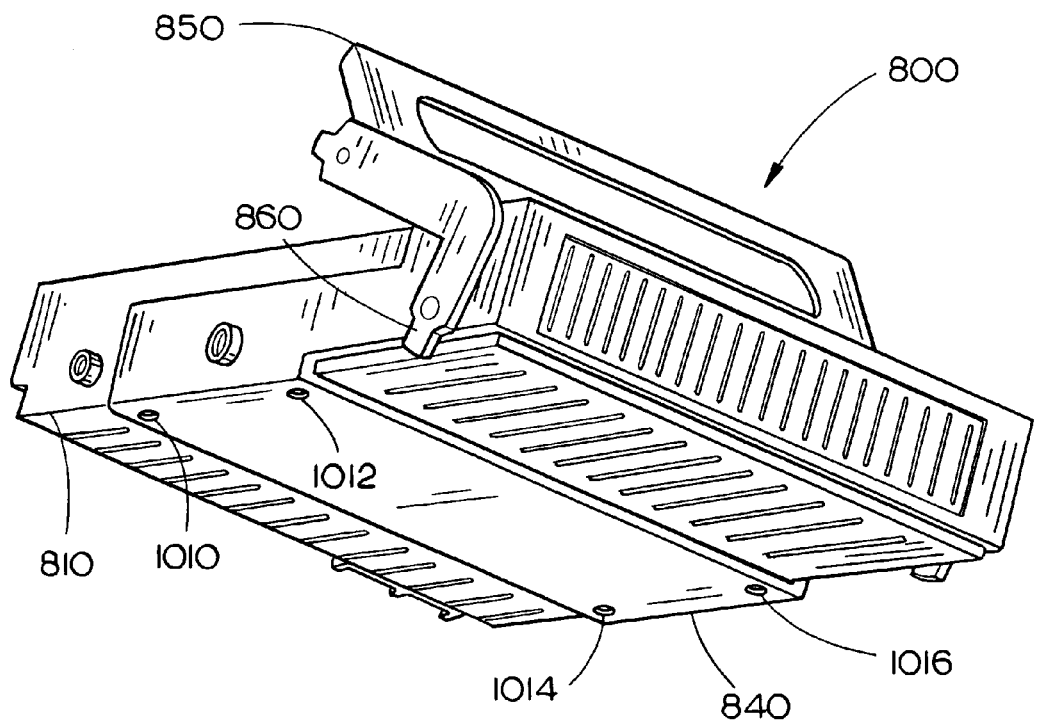
FIG. 10 depicts a base view of a carrier assembly including drive rollers in accordance with an embodiment of the present invention.

FIG. 10 depicts a base view of a carrier assembly 800 in accordance with an embodiment of the present invention. Drive holder 840 may extend to the base of the hard disk drive for protection of the drive electronics. Drive holder 840 may include a plurality of mounting holes 1010-1016. A fastener, such as a screw, may be employed through mounting holes 1010-1016 for mounting the drive 810 to the carrier assembly 800 utilizing existing holes in the drive itself. This may be advantageous as it allows easier mating with the drive and the SAS or SATA connectors more easily mate with the respective connectors of the multi-drive module. Drive holder 840 may not completely enclose the hard disk drive to allow ventilation for the drive 810.

Figure 11:
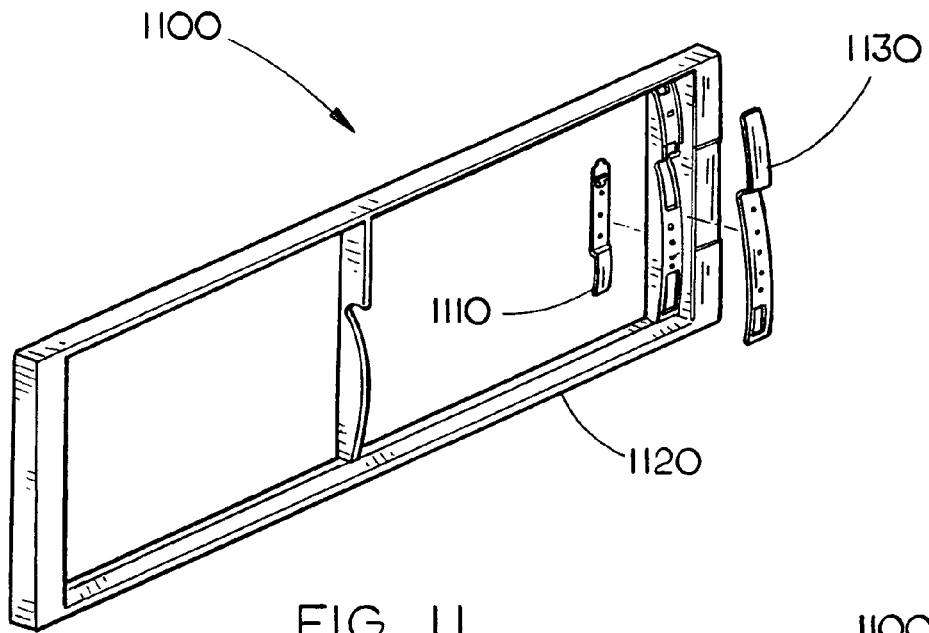
FIG. 11 depicts an exploded view of a bezel assembly in accordance with an embodiment of the present invention.

Referring to FIG. 11, an exploded view of a bezel assembly 1100 in accordance with an embodiment of the present invention is shown. Manufacturers of storage systems may manufacture storage systems for a variety of customers whereby each customer may desire a customized front exterior. For example, a first customer may desire a blue front exterior with a first logo while a second customer may desire an orange front exterior with a second logo. Conventionally, this previously required the manufacturer to stock different bezel assemblies with different colors and logos.

Figure 12:
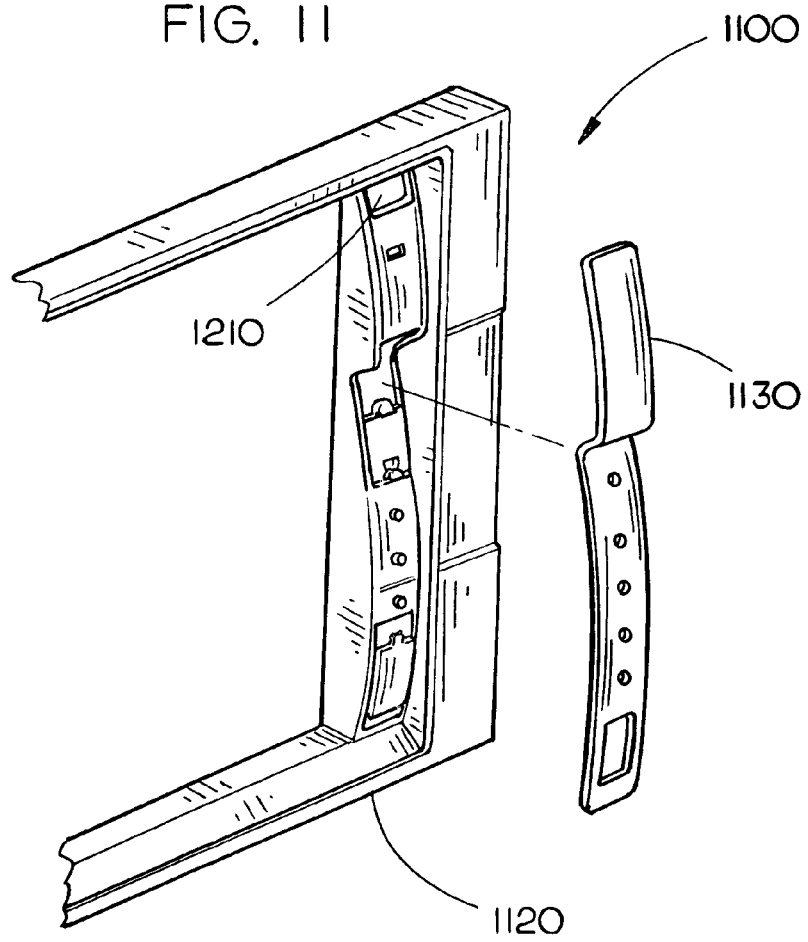
FIG. 12 depicts an installation of a fascia clip of a bezel assembly in accordance with an embodiment of the present invention.
Figure 13:
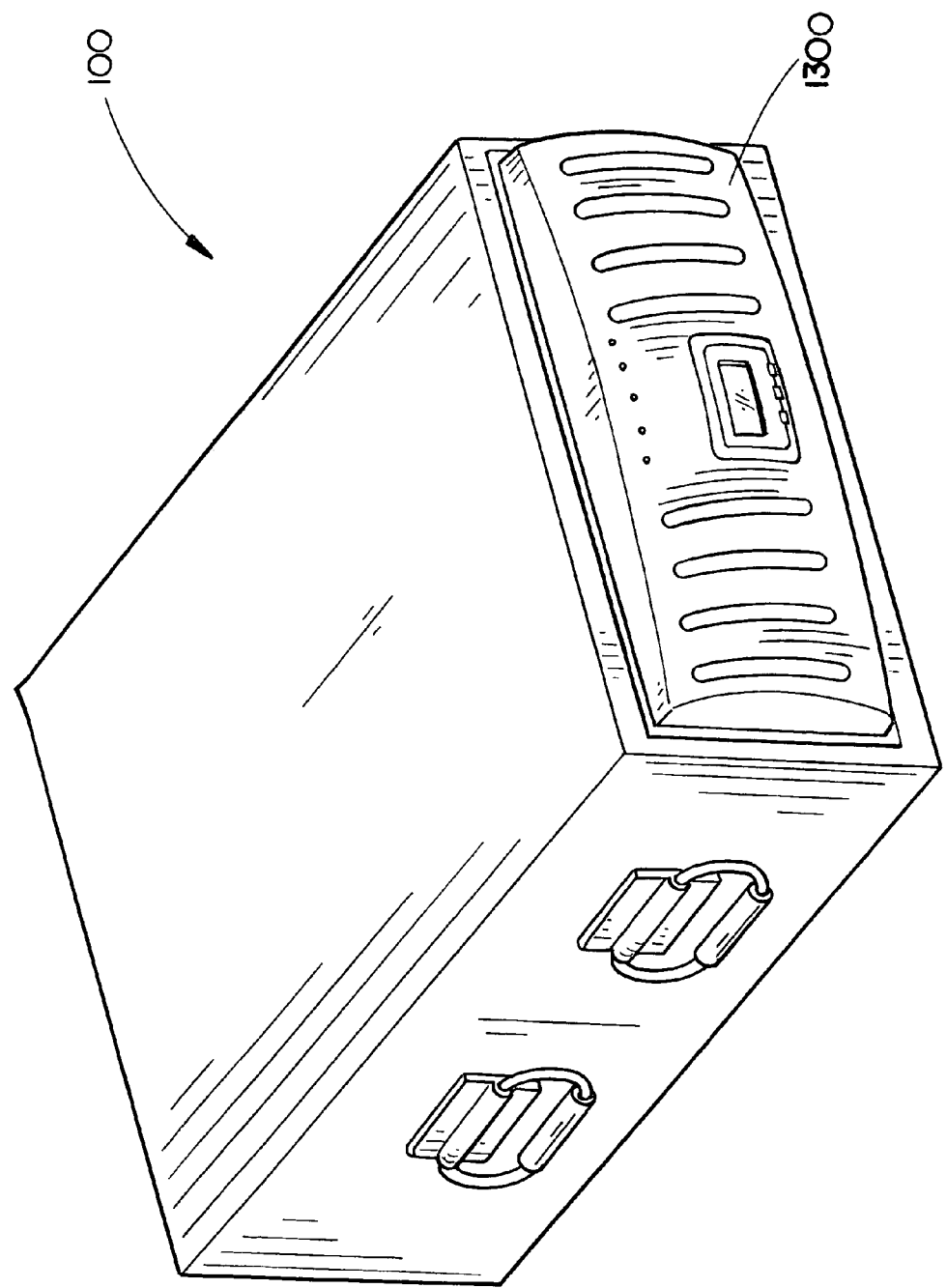
FIG. 13 depicts an alternative embodiment of a chassis assembly with a bezel in accordance with the present invention.

Bezel assembly 1100 may be utilized for multiple customers. A lightpipe 1110 may be mounted to the bezel 1120. Lightpipe 1110 may allow transfer of optical light from visible alerts to the exterior of the chassis assembly. In an alternative embodiment of the invention, lightpipe 1110 may be mounted between the bezel 1120 and fascia 1130. Fascia 1130 may be mounted to the bezel 1120. In an embodiment of the invention, fascia 1130 may be installed and removed in a tool-less fashion. FIG. 12 depicts an installation of a fascia clip of a bezel assembly 1100 in accordance with an embodiment of the present invention. Fascia clip may allow a fascia 1130 to be snap mounted into grooves 1210 of bezel 1120 and may support multiple platform configurations with minimum cost and stocking requirements as compared with previous generation products. Fascia 1130 may be uniquely designed as desired by a customer. Consequently, only the fascia 1130 may need to be stocked as compared to an entire bezel. This reduces costs for maintaining the inventory and reduces shipping costs. FIG. 13 depicts an alternative embodiment of a chassis assembly 100 including a bezel 1300 in accordance with an embodiment of the present invention.

It is believed that the method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A chassis assembly, comprising:
   a chassis;
   a plurality of multi-drive modules housed within said chassis, each multi-drive module of said plurality of multi-drive modules including a board for coupling to a plurality of drives and an interconnection coupled to said board; and
   a second board mounted within said chassis, wherein each drive of said plurality of drives is operatively coupled to said second board via said interconnection, said second board being in electrical contact with said interconnection of each multi-drive module when module is retained within said chassis, each drive of said plurality of drives being secured within a carrier assembly, said carrier assembly being mountable within a multi-drive module.

2. The chassis assembly as claimed in claim 1, wherein said chassis includes a plurality of handles.

3. The chassis assembly as claimed in claim 1, wherein said plurality of multi-drive modules are arranged in a side by side configuration.

4. The chassis assembly as claimed in claim 1, wherein each multi-drive module is capable of securing two rows of carrier assemblies.

5. The chassis assembly as claimed in claim 4, wherein said board of a multi-drive module is located in a middle portion of said multi-drive module, each drive being coupled to a connector on said board.

6. The chassis assembly as claimed in claim 5, wherein said board includes connectors located on two sides of said board of said multi-drive module.

7. The chassis assembly as claimed in claim 1, wherein said multi-drive module is tool-lessly removable from said chassis.

8. The chassis assembly as claimed in claim 7, wherein said multi-drive module is supported by said chassis in an extracted position.

9. The chassis assembly as claimed in claim 8, wherein said carrier assembly includes a handle.

10. The chassis assembly as claimed in claim 9, wherein said carrier assembly is removable from said multi-drive module by pulling said handle.

11. The chassis assembly as claimed in claim 9, wherein said multi-drive module includes a drive guide.

12. The chassis assembly as claimed in claim 11, wherein each drive includes a drive roller.

13. The chassis assembly as claimed in claim 12, wherein said drive roller includes a vibration dampening material.

14. The chassis assembly as claimed in claim 12, wherein said drive roller is secured within said drive guide when said carrier assembly is retained within said multi-drive module.

15. The chassis assembly as claimed in claim 1, wherein each multi-drive module includes a visible alert.

16. The chassis assembly as claimed in claim 15, wherein said visible alert indicates an error with a drive located within a multi-drive module.

17. The chassis assembly as claimed in claim 1, further comprising a bezel assembly.

18. The chassis assembly as claimed in claim 17, wherein said bezel assembly includes a lightpipe, a bezel and a removable fascia.

19. The chassis assembly as claimed in claim 18, wherein said removable fascia is tool-less mountable to said bezel.

20. A chassis assembly, comprising:
a chassis;
a plurality of multi-drive modules housed within said chassis, each multi-drive module of said plurality of multi-drive modules including a mid-plane circuit board for coupling to a plurality of drives and an interconnection coupled to a first circuit board, said mid-plane circuit board being coupled to each of said plurality of drives via connectors located on two sides of said mid-plane circuit board, each of said plurality of drives being secured within a carrier assembly, said carrier assembly being mountable within said multi-drive module; and
a second board mounted within said chassis; wherein each drive of said plurality of drives is operatively coupled to said second board via said interconnection, said board being in electrical contact with said interconnection of each multi-drive module when each multi-drive module is retained within said chassis.

21. The chassis assembly as claimed in claim 20, wherein each multi-drive module is capable of securing two rows of carrier assemblies.

22. The chassis assembly as claimed in claim 20, wherein each multi-drive module is tool-lessly removable from said chassis.

23. The chassis assembly as claimed in claim 20, wherein each multi-drive module is supported by said chassis in an extracted position.

24. The chassis assembly as claimed in claim 20, wherein said carrier assembly includes a handle.

25. The chassis assembly as claimed in claim 20, wherein said carrier assembly is removable from said multi-drive module by pulling said handle.

26. The chassis assembly as claimed in claim 20, wherein said multi-drive module includes a drive guide.

27. The chassis assembly as claimed in claim 26, wherein each drive includes a drive roller.

28. The chassis assembly as claimed in claim 27, wherein said drive roller includes a vibration dampening material.

29. The chassis assembly as claimed in claim 28, wherein said drive roller is secured within said drive guide when said carrier assembly is retained within said multi-drive module.

30. A multi-drive module for retention of drives within a chassis, comprising:
a frame;
a drive guide coupled to at least two sides of said frame;
a mid-plane circuit board, said mid-plane circuit board including a plurality of connectors; and
a plurality of carrier assemblies mountable within said frame via said drive guide, each carrier assembly securing a drive, said drive being coupled to said mid-plane circuit board via a connector of said plurality of connectors;
an interconnection, said interconnection being coupled to said mid-plane circuit board, said interconnection being suitable for connecting to a board of said chassis when said multi-drive module is retained within said chassis.

31. The multi-drive module as claimed in claim 30, wherein each multi-drive module is capable of securing two rows of carrier assemblies.

32. The multi-drive module as claimed in claim 30, wherein each multi-drive module is tool-lessly removable from said chassis.

33. The multi-drive module as claimed in claim 30, wherein said carrier assembly includes a handle.

34. The multi-drive module as claimed in claim 33, wherein said carrier assembly is removable from said multi-drive module by pulling said handle.

35. The chassis assembly as claimed in claim 30, wherein said multi-drive module includes a drive guide.

36. The multi-drive module as claimed in claim 35, wherein each drive includes a drive roller.

37. The multi-drive module as claimed in claim 36, wherein said drive roller includes a vibration dampening material.

38. The multi-drive module as claimed in claim 37, wherein said drive roller is secured within said drive guide when said carrier assembly is retained within said multi-drive module.

39. A chassis assembly, comprising:
a chassis;
a plurality of multi-drive modules housed within said chassis, each multi-drive module of said plurality of multi-drive modules including a board for coupling to a plurality of drives and an interconnection coupled to said board;

a second board mounted within said chassis, wherein each drive of said plurality of drives is operatively coupled to said second board via said interconnection, said second board being in electrical contact with said interconnection of each multi-drive module when module is retained within said chassis; and a bezel assembly, said bezel assembly including a light-pipe, a bezel and a removable fascia.

40. The chassis assembly as claimed in claim 39, wherein said removable fascia is tool-less mountable to said bezel.

* * * * *